United States Patent
Bruner et al.

(10) Patent No.: US 7,989,069 B2
(45) Date of Patent: *Aug. 2, 2011

(54) POLYMERIC ORGANOMETALLIC FILMS

(75) Inventors: Eric L. Bruner, San Diego, CA (US);
Eric L. Hanson, San Diego, CA (US);
Gerald W. Gruber, Englewood, FL (US)

(73) Assignee: Aculon, Inc., San Diego, CA (US)

( * ) Notice: Subject to any disclaimer, the term of this patent is extended or adjusted under 35 U.S.C. 154(b) by 1287 days.

This patent is subject to a terminal disclaimer.

(21) Appl. No.: 11/585,457

(22) Filed: Oct. 24, 2006

(65) Prior Publication Data
US 2007/0092735 A1   Apr. 26, 2007

Related U.S. Application Data

(60) Provisional application No. 60/729,632, filed on Oct. 24, 2005.

(51) Int. Cl.
*B32B 27/00* (2006.01)
(52) U.S. Cl. .......... 428/412; 428/413; 428/432; 428/472
(58) Field of Classification Search .................. None
See application file for complete search history.

(56) References Cited

U.S. PATENT DOCUMENTS

| | | | |
|---|---|---|---|
| 2,768,909 A | 10/1956 | Haslam | 117/121 |
| 2,984,641 A | 5/1961 | Wolinski | 260/41 |
| 3,057,753 A | 10/1962 | Blatz | 117/121 |
| 5,352,485 A | 10/1994 | DeGuire et al. | 427/226 |
| 5,638,479 A | 6/1997 | Takami et al. | 385/124 |
| 5,879,757 A | 3/1999 | Gutowski et al. | 427/491 |
| 6,146,767 A | 11/2000 | Schwartz | 428/457 |
| 6,395,341 B1 | 5/2002 | Arakawa et al. | 427/419.1 |
| 6,645,644 B1 | 11/2003 | Schwartz et al. | 428/632 |
| 6,737,145 B1 | 5/2004 | Watanabe et al. | 428/64.4 |
| 6,965,001 B2 | 11/2005 | Arakawa et al. | 525/474 |
| 2002/0094436 A1 | 7/2002 | Ohtake et al. | 428/333 |
| 2003/0104129 A1 | 6/2003 | Mino et al. | 427/346 |
| 2003/0130127 A1 | 7/2003 | Hentges et al. | 505/100 |
| 2006/0159923 A1 | 7/2006 | Becker-Willinger et al. | 428/403 |

FOREIGN PATENT DOCUMENTS

| | | |
|---|---|---|
| EP | 1 559 810 A2 | 8/2005 |
| GB | 2 208 874 A | 4/1989 |

OTHER PUBLICATIONS

Entry from Webster's Dictioanry Online www.webster.com for "pattern".*

* cited by examiner

*Primary Examiner* — Timothy Speer
*Assistant Examiner* — Adam Krupicka
(74) *Attorney, Agent, or Firm* — William J. Uhl

(57) ABSTRACT

An organometallic coating deposited from a metal alkoxide composition under conditions sufficient to form a polymeric metal oxide coating with unreacted alkoxide and hydroxyl groups is disclosed. Also disclosed are substrates coated with the organometallic coating and a method for applying the organometallic coating to a substrate.

10 Claims, No Drawings

POLYMERIC ORGANOMETALLIC FILMS

CROSS REFERENCE TO RELATED APPLICATION

The present application claims priority from U.S. Provisional Patent Application Ser. No. 60/729,632, filed Oct. 24, 2005.

FIELD OF THE INVENTION

The present invention relates to organometallic films and to methods of applying such films to surfaces of various substrates.

BACKGROUND OF THE INVENTION

Self-assembled films or layers on various substrates are well known in the art. These films or layers typically have functional groups (head groups) that bond to a cofunctional group on the substrate surface and organo groups that have some mutual attraction to neighboring molecules in the layer(s) or to the surface. The self-assembled films are used in various applications such as for medical and electrical use. In medical applications, the self-assembled films are used to form an interfacial layer between a titanium orthopedic implant and the surrounding body tissue. For electrical applications, the self-assembled films are useful for improving the performance of devices that incorporate organic-inorganic interfaces such as those found in organic light-emitting diodes. An example of a self-assembled organic layer is disclosed in U.S. Pat. No. 6,645,644 in which an organometallic compound such as a transition metal alkoxide is applied to a substrate such as a metal having a native oxide surface. The alkoxide groups react with the oxide groups forming a secure surface bond. The free or unreacted alkoxide groups are available for reaction with reactive groups such as acid groups in a subsequently applied layer. To prevent hydrolysis and self-condensation (polymerization), the organometallic compound can be applied to the substrate under vacuum by vapor deposition. The organometallic compound can also be applied by dipping or immersion coating with precaution being taken to remove excess organometallic compound by rinsing the coating with a nonreactive solvent once again to prevent hydrolysis and polymerization. These procedures are cumbersome and not suited for application to large surface areas or to continuous methods of application. In addition, such a film is very thin and has poor cohesive strength and film integrity resulting in gaps and film failure. It would be desirable to provide a simplified and more flexible procedure for the application of self-assembled films or layers to various substrates. Also, such films should be thicker, having better coverage and cohesive strength.

SUMMARY OF THE INVENTION

A method of providing an organometallic coating to a substrate surface comprising contacting the surface with a metal oxide composition under conditions sufficient to hydrolyze the metal oxide so as to deposit a polymeric metal oxide coating with unreacted alkoxide groups and hydroxyl groups.

Organo metallic films and substrates coated with the film prepared in accordance with the above-described method are also provided.

DETAILED DESCRIPTION OF THE INVENTION

The organometallic compound used in the method of the invention is preferably derived from a metal or a metalloid such as selected from Group III of the Periodic Table or a transition metal selected from Group IIIB, IVB, VB and VIB of the Periodic Table. Preferred metals are aluminum and transition metals selected from Group IVB. Titanium, zirconium and tantalum are the most preferred. The organo portion of the organometallic compound contains functional groups that are reactive with groups such as oxide and hydroxyl groups on the surfaces being treated. Examples of suitable organo groups of the organometallic compound are alkoxide groups containing from 1 to 18, preferably 2 to 8 carbon atoms, such as ethoxide, propoxide, isopropoxide, butoxide, isobutoxide and tert-butoxide. Other groups or ligands can also be present such as acetyl acetonates and chloride groups.

With regard to the preferred metals titanium and zirconium, the alkoxides are titanates and zirconates. These compounds can be reactive simple esters, polymeric forms of the esters and chelates that are relatively stable. Examples of various compounds include a. alkyl ortho esters of titanium and zirconium having the general formula $M(OR)_4$, wherein M is selected from Ti and Zr and R is $C_{1-18}$ alkyl, b. polymeric alkyl titanates and zirconates obtainable by condensation of the alkyl ortho esters of (a), i.e., partially hydrolyzed alkyl ortho esters of the general formula $RO[-M(OR)_2O-]_{x-1}R$, wherein M and R are as above and x is a positive integer, c. titanium chelates, derived from ortho titanic acid and polyfunctional alcohols containing one or more additional hydroxyl, keto, carboxyl or amino groups capable of donating electrons to titanium. These chelates have the general formula $$Ti(O)_a(OH)_b(OR')_c(XY)_d$$

wherein a=4−b−c−d; b=4−a−c−d; c=4−a−b−d; d=4−a−b−c; R' is H, R as above or X-Y,
wherein X is an electron donating group such as oxygen or nitrogen and Y is an aliphatic radical having a two or three carbon atom chain such as i. —$CH_2CH_2$—, e.g., of ethanolamine, diethanolamine and triethanolamine,

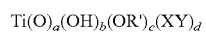

ii. e.g., of lactic acid,

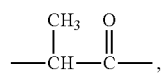

iii. e.g., of acetylacetone enol form, and

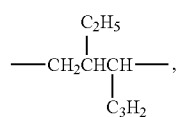

iv. e.g., as in 1,3-octyleneglycol d. titanium acylates having the general formula $Ti(OCOR)_{4-n}(OR)_n$ wherein R is $C_{1-18}$ alkyl as above and n is an integer of from 1 to 3, and polymeric forms thereof, e. mixtures thereof.

The organometallic compound is usually dissolved or dispersed in a diluent and when done so is hereinafter referred to as the organometallic composition. Examples of suitable diluents are alcohols such as methanol, ethanol and propanol, aliphatic hydrocarbons, such as hexane, isooctane and decane, ethers, for example, tetrahydrofuran and dialkylethers such as diethylether.

Also, adjuvant materials may be present in the organometallic composition. Examples include stabilizers such as sterically hindered alcohols, surfactants and anti-static agents. The adjuvants if present are present in amounts of up to 30 percent by weight based on the non-volatile content of the composition.

The concentration of the organometallic compound in the composition is not particularly critical but is usually at least 0.01 millimolar, typically from 0.01 to 100 millimolar, and more typically from 0.1 to 50 millimolar.

The organometallic treating composition can be obtained by mixing all of the components at the same time with low shear mixing or by combining the ingredients in several steps. The organometallic compounds are reactive with moisture, and care should be taken that moisture is not introduced with the diluent or adjuvant materials and that mixing is conducted in a substantially anhydrous atmosphere.

Examples of substrates coated by the method of the invention include those which have groups on their surface that are reactive with functional groups associated with the organometallic coating. Examples of such groups are oxide and/or hydroxyl groups. Non-limiting examples of such substrates are those which inherently have such groups on their surface or which form such groups on exposure to the environment. Examples of materials which form metal oxide surfaces upon exposure to ambient conditions include steels, including stainless steels, iron, and metals which acquire a non-ablating oxide coating upon exposure to the ambient environment, for example, tantalum, titanium, titanium alloys, aluminum, and aluminum alloys. Additional examples of materials that acquire an oxide layer upon exposure to the ambient conditions are ceramic materials, for example, silicon nitride. Also suitable in the method of the present invention are materials which have an oxide coating imparted to them, for example, thick film oxide insulators in semiconducting devices, and those which can be derivatized to have an oxide surface, for example, gallium arsenide, gallium nitride, and silicon carbide. Other examples include conducting oxides, such as indium tin oxide, deposited on a glass substrate. Also, metal oxides can be deposited on polymer substrates, for example, "stacked" metal oxides on polymer substrates to provide anti-reflective properties. Polymeric substrates themselves may have reactive functional groups. Examples are polymers that contain OH groups, such as acrylic copolymers made from one or more monomers that contain hydroxyl groups. Also, composite inorganic/organic polymers such as organo polymers containing entrained silica and/or alumina may be used. Also, polymer surfaces may be oxidized by subjecting them to atmospheric plasma treatment in the presence of air. Examples of substrates having hydroxyl groups are metals that have metal oxide groups on the surface, which hydrolyze to form hydroxyl groups, such as aluminum oxide and silicon nitride. The substrates can be in any configuration or form such as a plane or curved configuration or can be in a particulate form.

The organometallic composition can be applied directly to the substrate by spraying or by immersion coating, for example, dipping, rinsing or flood coating.

Alternatively, the organometallic compound can be applied to a carrier and the treated carrier contacted with the substrate to transfer the organometallic compound to the substrate. Suitable carriers for the present method include those that have absorbent or adsorbent properties for the organometallic composition. Thus, the carrier material can have, for example, the form of a reticulated or porous material that provides interstices into which the organometallic composition can be taken up by absorption. The carrier can also be non-porous, utilizing adsorptive properties, for example, a material which has an affinity for the coating solution such that it is readily "wetted" by the diluent of the organometallic composition. Suitable carrier materials will generally have a mixture of both types of properties. Accordingly, it will be appreciated that for some applications, a non-porous, smooth carrier will be employed which relies on adsorption of the organometallic composition. In other applications, the carrier will be porous or reticulate and have absorptive properties for the organometallic composition. Examples of suitable carriers include cellulose materials, for example, cotton. The treated carrier is then contacted with the substrate and moved across the surface of the substrate to transfer the organometallic compound to the surface.

While the organometallic composition is being applied to the substrate, whether being directly applied or applied indirectly by a carrier, the organometallic compound, i.e., the metal alkoxide, is exposed to conditions sufficient to form a polymeric (including oligomeric) metal oxide coating usually in a multilayer configuration with unreacted alkoxide and hydroxyl groups. This can be accomplished by applying the organometallic composition under conditions resulting in hydrolysis and self-condensation of the metal alkoxide. These reactions result in a polymeric metal oxide coating being formed that provides cohesive strength to the film. The conditions necessary for these reactions to occur is to deposit the film in the presence of water, such as a moisture-containing atmosphere. If the organometallic composition is applied by spraying or by immersion, the excess organometallic composition is preferably not removed by external means such as by rinsing with a solvent. This results in a thicker, more durable film. Typically, the thickness of the film (after diluent evaporation) will be between 10 and 100 nanometers. The resulting film will have unreacted alkoxide groups and hydroxyl groups for reaction and possible covalent bonding with the reactive groups on the substrate surface and with a possible overlayer material. Concurrently with the self-condensation reaction, the diluent is evaporated. Depending on the reactivity of the alkoxide groups in the metal alkoxide and the reactive groups on the substrate surface, heating may be required to bond the polymeric metal oxide to the substrate. For example, temperatures of 50 to 200° C. may be used. However, for readily co-reactive groups, ambient temperatures, that is, 20° C., may be sufficient. Although not intending to be bound by any theory, it is believed the polymeric metal oxide is of the structure:

$$[M(O)_x(OH)_y(OR)_z]_n$$

where M is a metal, R is an alkyl group containing from 1 to 30 carbon atoms; $x+y+z=V$, the valence of M; x is at least 1, y is at least 1, z is at least 1; $x=V-y-z$; $y=V-x-z$; $z=V-x-y$; n is greater than 2, such as 2 to 1000.

The process of the present invention can be used to provide a film or layer that is continuous or discontinuous that is in a pattern on the substrate surface. Thus, the organometallic composition can be provided to the carrier in a pattern that will be transferred to the substrate surface. Numerous means can be used to provide a pattern of organometallic composition on the carrier. Non-limiting examples include spraying the composition onto the carrier in only pre-determined areas, for example, by ink-jet printing and stenciling. Other methods may be found by adapting printing techniques, including stamping, lithographing and gravure printing a coating solution onto the carrier in a pattern.

In a similar manner, the carrier itself can be provided in the form of a pattern, for example, a stencil, a stamp or a printing roller. In this manner, when the organometallic composition is conveyed to the substrate surface, the pattern of the carrier will transfer the composition to an oxide surface in a like pattern. Besides stenciling and stamping, the organometallic composition can be applied by gravure, screen printing and lithography.

It will also be appreciated that when the carrier conveying the composition is in a form suitable for mechanical manipulation, for example, in the form of a roller or ball, it can be mechanically directed in a pattern across the substrate surface to provide a layer having a pattern reflecting the path along which the roller or ball was directed on the surface.

As mentioned above, an overlayer can be applied to the organometallic film. Such an overlayer material would contain groups that are reactive with the alkoxide and/or hydroxyl groups, such as acid groups or derivatives thereof. Preferred overlayers are layers derived from organophosphorus acids such as organophosphoric acids, organophosphonic acids and organophosphinic acids including derivatives thereof. See, for example, the organophosphorus acids described in U.S. Pat. No. 6,645,644.

By derivatives of acid groups is meant materials that perform similarly as the acid precursors and include acid salts, acid esters and acid complexes.

With regard to the organophosphorus acids, the organo group may be a monomeric, oligomeric or polymeric group. Examples of monomeric phosphorus acids are phosphoric acids, phosphonic acids and phosphinic acids including derivatives thereof.

Examples of monomeric phosphoric acids are compounds or a mixture of compounds having the following structure:

$$(RO)_x\text{---}P(O)\text{---}(OR')_y$$

wherein x is 1-2, y is 1-2 and x+y=3, R preferably is a radical having a total of 1-30, preferably 6-18 carbons, where R' is H, a metal such as an alkali metal, for example, sodium or potassium or lower alkyl having 1 to 4 carbons, such as methyl or ethyl. Preferably, a portion of R' is H. The organic component of the phosphoric acid (R) can be aliphatic (e.g., alkyl having 2-20, preferably 6-18 carbon atoms) including an unsaturated carbon chain (e.g., an olefin), or can be aryl or aryl-substituted moiety.

Example of monomeric phosphonic acids are compounds or mixture of compounds having the formula:

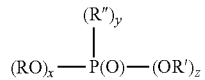

wherein x is 0-1, y is 1, z is 1-2 and x+y+z is 3. R and R" preferably are each independently a radical having a total of 1-30, preferably 6-18 carbons. R' is H, a metal, such as an alkali metal, for example, sodium or potassium or lower alkyl having 1-4 carbons such as methyl or ethyl. Preferably at least a portion of R' is H. The organic component of the phosphonic acid (R and R") can be aliphatic (e.g., alkyl having 2-20, preferably 6-18 carbon atoms) including an unsaturated carbon chain (e.g., an olefin), or can be an aryl or aryl-substituted moiety.

Example of monomeric phosphinic acids are compounds or mixture of compounds having the formula:

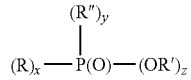

wherein x is 0-2, y is 0-2, z is 1 and x+y+z is 3. R and R" preferably are each independently radicals having a total of 1-30, preferably 6-18 carbons. R' is H, a metal, such as an alkali metal, for example, sodium or potassium or lower alkyl having 1-4 carbons, such as methyl or ethyl. Preferably a portion of R' is H. The organic component of the phosphinic acid (R, R") can be aliphatic (e.g., alkyl having 2-20, preferably 6-18 carbon atoms) including an unsaturated carbon chain (e.g., an olefin), or can be an aryl or aryl-substituted moiety.

Examples of organo groups which may comprise R and R" include long and short chain aliphatic hydrocarbons, aromatic hydrocarbons and substituted aliphatic hydrocarbons and substituted aromatic hydrocarbons. Examples of substituents include carboxyl such as carboxylic acid, hydroxyl, amino, imino, amido, thio, cyano, fluoro such as $CF_3(C_nF_{2n})CH_2CH_2PO_3H_2$ where n=3-15, $CF_3(CF_2)_xO(CF_2CF_2)_y$—$CH_2CH_2$—$PO_3H_2$ where x is 0 to 7, y is 1 to 20 and x+y≦27, phosphonate, phosphinate, sulfonate, carbonate and mixed substituents.

Representative of the organophosphorus acids are as follows: amino trismethylene phosphonic acid, aminobenzylphosphonic acid, 3-amino propyl phosphonic acid, O-aminophenyl phosphonic acid, 4-methoxyphenyl phosphonic acid, aminophenylphosphonic acid, aminophosphonobutyric acid, aminopropylphosphonic acid, benzhydrylphosphonic acid, benzylphosphonic acid, butylphosphonic acid, carboxyethylphosphonic acid, diphenylphosphinic acid, dodecylphosphonic acid, ethylidenediphosphonic acid, heptadecylphosphonic acid, methylbenzylphosphonic acid, naphthylmethylphosphonic acid, octadecylphosphonic acid, octylphosphonic acid, pentylphosphonic acid, phenylphosphinic acid, phenylphosphonic acid, bis-(perfluoroheptyl) phosphinic acid, perfluorohexyl phosphonic acid, styrene phosphonic acid, dodecyl bis-1,12-phosphonic acid.

In addition to the monomeric organophosphorus acids, oligomeric or polymeric organophosphorus acids resulting from self-condensation of the respective monomeric acids may be used.

The organophosphorus acid is typically dissolved or dispersed in a diluent. Suitable diluents include alcohols such as methanol, ethanol or propanol; aliphatic hydrocarbons such as hexane, isooctane and decane, ethers, for example, tetrahydrofuran and dialkylethers such as diethylether. Also, aqueous alkaline solutions such as sodium and potassium hydroxide can be used as the diluent.

Adjuvant materials may be present with the organophosphorus acid and the diluent (organophosphorus acid compositions). Examples include surface active agents, wetting agents, and anti-static agents. The adjuvant if present is present in amounts of up to 30 percent by weight based on the non-volatile content of the organophosphorus acid composition.

The concentration of the organophosphorus acid in the composition is not particularly critical but is at least 0.01 millimolar, typically 0.01 to 100 millimolar, and more typically 0.1 to 50 millimolar. The organophosphorus acid composition can be prepared by mixing all of the components at the same time with low shear mixing or by adding the components in several steps.

The organophosphorus acid composition is typically applied to the organometallic layer by spraying, immersion such as dipping, or by the use of a carrier as described above for application of the organometallic layer.

In an alternate embodiment, the organophosphorus acid or derivative thereof may be prereacted with the organometallic compound to form a reaction product. For example, a transition metal alkoxide can be reacted with an organophosphorus acid such as those described above to form an organometallic compound with mixed groups or ligands, that is, alkoxide ligands and organophosphorus ligands. The reaction product can then be dissolved or dispersed in a suitable diluent, combined with adjuvants if necessary and deposited to a substrate under conditions sufficient to form a polymeric metal oxide composition with alkoxide, hydroxyl and organophosphorus ligands.

EXAMPLES

The following examples are intended to illustrate the invention, and should not be construed as limiting the invention as many different embodiments can be made without departing from the spirit and scope of the invention. Therefore, the invention is not limited except as defined in the claims.

The following examples show the deposition of an organometallic film to a substrate under conditions sufficient to form a polymeric metal oxide with unreacted alkoxide and hydroxyl groups. The films were deposited by immersion (dipping), wiping and spraying. An organophosphorus layer was subsequently applied to the organometallic layer to modify the surface properties of the substrate.

Example 1

A polycarbonate plano lens blank coated with a polysiloxane anti-scratch coating (hard coat) was oxidized in an atmospheric plasma apparatus (Lectro Engineering Company Model LTIII) using air and a Corona discharge source for 10 seconds.

The oxidized lens was then dipped into a 0.25 percent by weight solution of titanium tetra n-butoxide in the monomethylether of propylene glycol, subjected to ultrasonic vibration for 90 seconds (sonification), withdrawn and blown dry with warm air (50° C.), resulting in a film of polymeric titanium oxide with unreacted alkoxide and hydroxyl groups adhered to the lens surface. The treated lens was then dipped in a 0.2 percent by weight solution of poly(hexafluoropropylene oxide) phosphonic acid (number average molecular weight 1582) in a mixed 90 percent by volume methanol 10 percent by volume of HFE-7100, a fluorinated solvent available from the 3M Company and then subjected to ultrasonication for 5 minutes. The lens was withdrawn slowly (2 cm/min) from the solution resulting in a dry film of poly (hexafluoropropylene oxide) phosphonate covalently bonded to the polymeric titanium oxide film.

The resultant coating had a water contact angle of 117° and a squalene contact angle of 92° C. indicating the film was both hydrophobic and oleophobic. Test data shown in Table I below confirmed that the composite film was strongly bound to the lens surface.

Example 2

An oxidized plano lens as described in Example 1 was coated by wiping for 5 seconds with a cellulose tissue ('Kimwipe' manufactured by Kimberly Clark) impregnated with a 0.25 percent by weight solution of titanium tetra n-butoxide in dry petroleum distillates (100-140° C. boiling range). This resulted in a strongly bound dry film on the lens surface of polymeric titanium oxide with alkoxide and hydroxyl groups. The lens was wiped with a cellulose tissue impregnated with a 0.2 percent by weight solution of poly(hexafluoropropylene oxide) phosphonic acid solution used in Example 1. Excess material was removed by gently rubbing the surface with a cellulose tissue impregnated with isopropanol. This resulted in a dry film of poly(hexafluoropropylene oxide) phosphonate covalently bonded to the polymeric titanium oxide film. The resultant coating had a water contact angle of 116° and a squalene contact angle of 92° indicating both hydrophobicity and oleophobicity. Test data in Table I below confirmed that the composite film was strongly bound to the lens surface.

Example 3

An oxidized plano lens as described in Example 1 was coated by spraying with a compressed air sprayer a titanium tetra n-butoxide solution used in Example 2. Spraying was done in one pass at 60 psi and 6 inch distance from the lens to the spray orifice. This resulted in a strongly bound dry film of polymeric titanium oxide with alkoxide and hydroxyl groups on the lens surface. The treated lens was then dipped in the poly(hexafluoropropylene oxide) phosphonic acid solution used in Example 1 and subjected to sonification for 5 minutes. The lens was slowly withdrawn from the solution (2 cm/min) resulting in a dry film of poly(hexafluoropropylene oxide) phosphonate covalently bonded to the polymeric metal oxide film. The composite film was then cured at 120° C. for 10 minutes.

The coated lens had a water contact angle of about 118° and a squalene contact angle of 90° indicating both hydrophobicity and oleophobicity.

Test data in Table I below confirmed the composite film was strongly bound to the lens surface.

Example 4

A polycarbonate lens coated with the polysiloxane coating of Example 1 was dipped into a 0.2 percent by weight solution of zirconium tetra n-butoxide in isopropanol. The lens was slowly withdrawn (0.25 cm/min) from the solution and oxidized with the atmospheric plasma source as described in Example 1 for 10 seconds. This resulted in a strongly bound film of polymeric zirconium oxide with alkoxide and hydroxyl groups on the lens surface.

A fluorinated phosphonate coating was deposited as described in Example 3 and resulted in a film with a water contact angle of 120° and a squalene contact angle of 96°. The data in Table I below confirmed the composite film was strongly bound to the lens surface.

Example 5

An oxidized plano lens as described in Example 1 was coated with a polymeric titanium oxide film as described in Example 2. A fluorinated phosphonate coating was then deposited as described in Example 2 and resulted in a film that was both hydrophobic and oleophobic. Test data in Table I below confirmed the composite film was strongly bound to the lens surface.

Example 6

An oxidized plano lens as described in Example 1 was dipped into a 0.25 percent by weight solution of zirconium tetra n-butoxide in dry 2-ethylhexanol subjected to ultrasonication and blown dry as described in Example 1 resulting in a film of polymeric zirconium oxide with unreacted alkoxide and hydroxyl groups adhered to the lens surface. The lens was wiped with a cellulose tissue impregnated with poly (hexafluoropropylene oxide) phosphonic acid solution as described in Example 2. After removal of excess solution, the coating was cured at 120° C. for 10 minutes. This resulted in a dry film of poly(hexafluoropropylene oxide) phosphonate bound to the polymeric zirconium oxide surface. Test Data shown in Table I below confirmed that the composite film was strongly bound to the lens surface.

Example 7

In this example, the metal alkoxide and organophosphonic acid were prereacted before application to the substrate.

Titanium bis-acetylacetonate diisopropoxide ("TiAA") (0.033 millimol) was dissolved in 10 ml of dry isopropanol warmed to 60° C. and added dropwise with stirring to 0.033 millimoles of poly(hexafluoropropylene oxide) phosphonic acid ("HFPOPA") dissolved in 10 ml of refluxing isopropyl alcohol. The reaction mixture was then stirred at 60° C. for an additional 10 minutes and allowed to cool to room temperature after which a suspended sol formed. After a few days, the solid precipitated. The isopropyl alcohol layer was decanted and the TiAA-HFPOPA reaction product was resuspended in HFE-7100. A coating of the TiAA-HFPOPA suspension was applied with a TLC sprayer (15 psi compressed nitrogen) to an oxidized lens as described in Example 1 and cured at 120° C. for 10 minutes. The resulting coating was both hydrophobic and oleophobic. Test Data shown in Table I below confirmed the film was strongly bound to the lens surface.

TABLE I

Water Contact Angle and Durability of Coatings of Examples 1-7

| Example No. | Initial Water Contact Angle[1] | Isopropyl Alcohol Treatment[2] | PBS Boil[3] | Sweat Immersion[4] | WINDEX Treatment[5] |
|---|---|---|---|---|---|
| 1 | 117 | 114 | 118 | 115 | 112 |
| 2 | 116 | 114 | 114 | 113 | 112 |
| 3 | 118 | 111 | 114 | 118 | 112 |
| 4 | 120 | 115 | 113 | 114 | 111 |
| 5 | 116 | 112 | 115 | 116 | 112 |
| 6 | 117 | 103 | 114 | 116 | 110 |
| 7 | 115 | 112 | 118 | 110 | 114 |

[1]Water contact angle determined using a contact angle Goniometer TANTEC Contact Angle Meter, Model CAM-MICRO.
[2]Isopropyl alcohol treatment involved rubbing a coated lens with tissue saturated with isopropyl alcohol with a force of 200 grams/square centimeter. After 500 rubs, the water contact angle was determined.
[3]The PBS boil test involved immersing the coated lens in a boiling phosphate buffer solution (4.5% NaCl/0.8% NaHPO$_4$ x 2H$_2$O in distilled water) for 2 minutes followed by immersing in room temperature water, removal from the water, drying at 55° C. for 5 minutes, and then measuring the water contact angle.
[4]The sweat immersion test involved immersing the coated lens in a concentrated synthetic "sweat" solution (6% NaCl/12% lactic acid in distilled water) at a temperature of 55° C. for 2 hours. The lens was removed, rinsed with deionized water, dried at 55° C. for 5 minutes, and followed by determination of the water contact angle.
[5]WINDEX treatment involved rubbing a coated lens with tissue saturated with WINDEX brand cleaner with a force of 200 grams/cm$^2$. After 500 rubs, the water contact angle was determined.

What is claimed is:

1. A coated substrate having an organometallic film deposited thereon; in which the substrate has oxide and/or hydroxyl groups that are inherent on the substrate surface or form such groups on exposure to ambient environment; the organometallic film being a polymeric metal oxide having unreacted hydroxyl and alkoxide groups having the structure:

$$[M(O)_x(OH)_y(OR)_z]_n$$

where M is a metal, R is an alkyl group containing from 1 to 30 carbon atoms; $x+y+z=V$, the valence of M; x is at least 1, y is at least 1, z is at least 1; $x=V-y-z$; $y=V-x-z$; $z=V-x-y$; n is from 2 to 1000 and being covalently bonded to the substrate surface through reaction of the surface oxide and/or hydroxyl groups with the alkoxide and hydroxyl groups associated with the polymeric metal oxide.

2. The coated substrate of claim 1 in which the substrate is selected from a metal, metalloid, polymer, ceramic and glass.

3. The coated substrate of claim 1 in which the substrate is in plane, curved or particulate form.

4. The coated substrate of claim 1 in which the metal associated with the polymeric metal oxide is a transition metal selected from Group IIIB, IVB, VB and VIB of the Periodic Table.

5. The coated substrate of claim 1 in which the metal associated with the polymeric metal oxide is selected from aluminum, titanium and zirconium.

6. The coated substrate of claim 1 in which the alkoxide group associated with the polymeric metal oxide is a $C_1$ to $C_{18}$ alkoxide group.

7. The coated substrate of claim 1 in which the organometallic film is in the form of a pattern.

8. A coated substrate having an organometallic film deposited thereon; in which the substrate has oxide and/or hydroxyl groups that are inherent on the substrate surface or form such groups on exposure to ambient environment; the organometallic film being a polymeric metal oxide having unreacted hydroxyl and alkoxide groups and being covalently bonded to the substrate surface through reaction of the surface oxide and/or hydroxyl groups with the alkoxide and hydroxyl groups associated with the polymeric metal oxide and a coating adhered to the organometallic film; the coating being covalently bonded to the organometallic film through reaction of acid groups or derivatives thereof of the coating and alkoxide and hydroxyl groups associated with the organometallic film.

9. The coated substrate of claim 8 in which the subsequently applied coating is derived from an organophosphorus acid or derivative thereof.

10. The coated substrate of claim 9 in which the organophosphorus acid or derivative thereof is selected from an organophosphoric acid, an organophosphinic acid and an organophosphonic acid including derivatives thereof.

* * * * *